United States Patent Office 3,699,105
Patented Oct. 17, 1972

3,699,105
4-[1-(ω-BENZOYLALKYL)-3-PYRROLIDINYL]-2H-1,4-BENZOXAZIN-3(4H)-ONES
Grover Cleveland Helsley, Richmond, Va., assignor to A. H. Robins Company, Incorporated, Richmond, Va.
No Drawing. Filed July 7, 1969, Ser. No. 839,705
Int. Cl. C07d 87/50
U.S. Cl. 260—244 R          6 Claims

ABSTRACT OF THE DISCLOSURE

4 - [1 - (ω - benzoylalkyl) - 3 - pyrrolidinyl] - 2H-1,4-benzoxazin - 3(4H) - ones prepared by condensation of 4 - (3 - pyrrolidinyl) - 2H - 1,4 - benzoxazin - 3(4H)-ones and ω-benzoylalkyl halides. The compounds are tranquilizers.

The present invention relates to a new group of 4-[1 - (ω - benzoylalkyl) - 3 - pyrrolidinyl] - 2H - 1,4-benzoxazin-3(4H)-ones of the general structural formula:

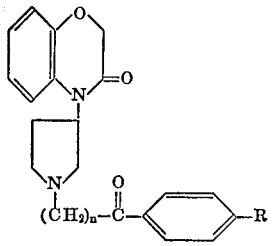

Formula I and the pharmaceutically acceptable salts thereof. In Formula I, R is hydrogen, halogen having an atomic weight less than 80, lower alkyl, lower alkoxy, and $n$ is a positive integer from 2 to 4 inclusive.

The organic bases of Formula I form pharmaceutically acceptable salts with inorganic acids such as hydrochloric, hydrobromic, sulfuric and sulfamic and with strong organic acids including oxalic, maleic, fumaric, citric, benzoic, tartaric, and related acids. The salts are readily prepared by methods known to the art.

The compounds of the invention can be prepared by the condensation of an ω-benzoylalkyl halide of the formula:

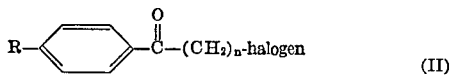

(II)

with a 4-(3-pyrrolidinyl) - 2H - 1,4 - benzoxazin-3(4H)-one of the formula:

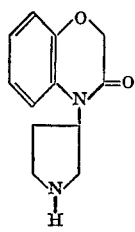

(III)

The reaction can be carried out in an inert solvent as, for example, an aromatic hydrocarbon including benzene, toluene and xylene, a lower alkanol, e.g., ethanol, propanol and n-butanol and in a lower alkanone, e.g., acetone or butanone. In a preferred method the compounds of Formula II are used as their cyclic ketals, i.e., as 2 - phenyl - 2 - (ω - haloalkyl) - 1,3 - dioxolanes. The free ketone group is regenerated by mild acid hydrolysis.

The intermediate ω-benzoylalkyl halides of Formula II are available commercially or they can be prepared by the method of Close, J. Am. Chem. Soc., 79, 1455 (1957) or as disclosed in Belgium Patent 577,977.

The intermediate 4 - (3 - pyrrolidinyl) - 2H - 1,4-benzoxazin - 3(4H) - one of Formula III can be prepared as disclosed in copending application, Ser. No. 839,658, filed on even date herewith.

Compounds of Formula I, wherein $n$ is 2, can also be prepared by the condensation of an N,N-di-loweralkyl-2-benzoylethylamine of the formula:

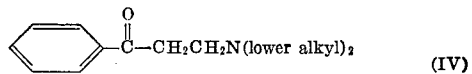

(IV)

with a 4 - (3 - pyrrolidinyl) - 2H - 1,4 - benzoxazin-3(4H)-one of Formula III. The condensation is preferably carried out in a solvent such as dimethylformamide.

In the definition of terms used throughout the specification, "lower alkyl" includes groups having one to eight carbon atoms such as methyl, ethyl, propyl, isopropyl, butyl, amyl, hexyl, heptyl, octyl and the like. Lower alkoxy has the formula —O—lower alkyl.

The compounds of this invention have useful pharmacological properties. They have been found useful for administering to laboratory animals in studying the behavior thereof and in studying drug effects on the central nervous system. The compounds corresponding to Formula I have been found to be particularly useful as tranquilizing agents. They are active in mice and rats in intraperitoneal doses of 5–50 mg./kg. when evaluated in the standard test procedure in which animals are administered a compound and observed for behavioral effects.

The novel compounds of the present invention are formulated for use by incorporating them into standard pharmaceutical dosage forms such as capsules, tablets and injectables containing 0.1 to 500 mg., the exact dosage varying with the weight and age of the subject being treated, and the severity of the condition. Among the pharmaceutical excipients which can be used are gelatin, talc, lactose, magnesium carbonate and sodium carboxymethylcellulose.

It is, accordingly, an object of the present invention to provide novel compounds which are useful as tranquilizers. A further object is to provide a method for preparing the novel 4 - [1 - (ω - benzoylalkyl) - 3 - pyrrolidinyl] - 2H - 1,4 - benzoxazine - 3(4H) - ones of the present invention. Additional objects will be apparent to one skilled in the art and still other objects will become apparent hereinafter.

The compounds which constitute this invention and the methods for preparation will appear more fully from a consideration of the following examples which are given for purpose of illustration only and are not to be construed as limiting the invention in spirit or in scope.

EXAMPLE 1

4-{1-[3-(p-fluorobenzoyl)propyl]-3-pyrrolidinyl}-2H-1,4-benzoxazin-3(4H)-one oxalate A mixture of 5.0 g. (0.023 mole) of 4-(3-pyrrolidinyl)-2H-1,4-benzoxazin-3(4H)-one, 6.4 g. (0.026 mole) of 2-(p-fluorophenyl)-2-(γ-chloropropyl)-1,3-dioxolane, 10 g. of potassium carbonate and 100 ml. of n-butanol was stirred and refluxed for 16 hours, cooled, filtered and the solvent evaporated at reduced pressure. The residual oil was stirred for one hour with a solution of 100 ml. of ethanol and 100 ml. of 3 N hydrochloric acid to regenerate the free ketone. The solution was made basic with 50% sodium hydroxide solution and extracted with benzene. The benzene solution was extracted with 3 N hydrochloric acid, the acid layer was separated and neutralized with sodium bicarbonate solution. The oil which separated was extracted with ether and the combined ether extracts were washed with water and dried over magnesium sulfate. The solvent was evaporated, leaving 3.6 g. (41% yield) of an oil which was treated with a solution of 1.2 g. (0.009 mole) of oxalic acid dihydrate in ether. The oxalate salt which formed was recrystallized from an isopropanol-isopropyl ether mixture, yielding 2.9 g. (28%) of product melting at 146–147° C.

Analysis.—Calcd. for $C_{24}H_{25}FN_2O_7$ (percent): C, 61.01; H, 5.33; N, 5.93. Found (percent): C, 60.63; H, 5.31; N, 6.03.

EXAMPLE 2

When, in the procedure of Example 1, 2 - (p-fluorophenyl)-2-(γ-chloropropyl)-1,3-dioxolane is replaced by an equimolar amount of:

2-phenyl-2(δ-chlorobutyl)-1,3-dioxolane,
2-(p-chlorophenyl)-2-(γ-chloropropyl)-1,3-dioxolane,
2-(p-bromophenyl)-2-(γ-chloropropyl)-1,3-dioxolane,
2-phenyl-2-(δ-chlorobutyl)-1,3-dioxolane,
2-(p-chlorophenyl)-2-(δ-chlorobutyl)-1,3-dioxolane,
2-(p-tolyl)-2-(γ-chloropropyl)-1,3-dioxolane,
2-(p-tolyl)-2-(δ-chlorobutyl)-1,3-dioxolane,
2-(p-anisyl)-2-(γ-chloropropyl)-1,3-dioxolane,
2-(p-anisyl)-2-(δ-chlorobutyl)-1,3-dioxolane,
2-(p-ethoxy)-2-(δ-chlorobutyl)-1,3-dioxolane, and
2-(p-ethoxy)-2-(γ-chloropropyl)-1,3-dioxolane, there are obtained, 4-[1-(3-benzoylpropyl)-3-pyrrolidinyl]-2H-1,4-benzoxazin-3(4H)-one,
4-{1-[3-(-p-chlorobenzoyl)propyl]-3-pyrrolidinyl}-2H-1,4-benzoxazin-3(4H)-one,
4-{1-[3-(p-bromobenzoyl)propyl]-3-pyrrolidinyl}-2H-1,4-benzoxazin-3(4H)-one,
4-[1-(4-benzoylbutyl)-3-pyrrolidinyl]-2H-1,4-benzoxazin-3(4H)-one,
4-{1-[4-(p-chlorobenzoyl)butyl]-3-pyrrolidinyl}-2H-1,4-benzoxazin-3(4H)-one,
4-{1-[3-(p-methylbenzoyl)propyl]-3-pyrrolidinyl}-2H-1,4-benzoxazin-3(4H)-one,
4-{1-[4-p-methylbenzoyl)butyl]-3-pyrrolidinyl}-2H-1,4-benzoxazin-3(4H)-one,
4-{1-[3-(p-methoxybenzoyl)propyl]-3-pyrrolidinyl}-2H-1,4-benzoxazin-3(4H)-one,
4-{1-[4-(p-methoxybenzoyl)butyl]-3-pyrrolidinyl}2H-1,4-benzoxazin-3(4H)-one,
4-{1-[4-(p-ethoxybenzoyl)butyl]-3-pyrrolidinyl}-2H-1,4-benzoxazin-3-(4H)-one, and
4-{1-[3-(p-ethoxybenzoyl)propyl]-3-pyrrolidinyl}-2H-1,4-benzoxazin-3(4H)-one.

EXAMPLE 3

4-[1-(2-benzoylethyl)-3-pyrrolidinyl]-2H-1,4-benzoxazin-3(4H)-one oxalate

A mixture of 4.9 g. (0.023 mole) of 2-benzoylethyldimethylamine hydrochloride, 5.0 g. (0.023 mole) of 4-(3-pyrrolidinyl)-2H-1,4-benzoxazin-3(4H)-one and 6 g. of potassium carbonate was stired in 80 ml. of dimethylformamide at about 70° C. while a stream of nitrogen was bubbled through the mixture to remove the dimethylamine as it was formed. After 4 hours the mixture was cooled and treated with 200 ml. of water. The oil which separated was extracted with benzene and the combined extracts were washed with water, dried and the solvent evaporated. The residual oil was taken up in isopropyl ether and treated with solution of 2.9 g. (0.023 mole) of oxalic acid dihydrate in isopropanol. The oxalate salt was recrystallized from the same solvent mixture yielding 6.5 g. (65%) of the salt melting at 105–110° C. The salt melted at 107–111° C. after it was recrystallized again from the isopropyl ether-isopropanol.

Analysis.—Calcd. for $C_{23}H_{24}N_2O_7$ (percent): C, 62.72; H, 5.49; N, 6.36. Found (percent): C, 62.39; H, 5.49; N, 6.37.

EXAMPLE 4

When, in the procedure of Example 3, N,N-dimethyl-2-benzoylethylamine hydrochloride is replaced by an equimolar amount of:

N,N-dimethyl-2-(p-fluorobenzoyl)ethylamine,
N,N-dimethyl-2-(p-methylbenzoyl)ethylamine, and
N,N-dimethyl-2-(p-methoxybenzoyl)ethylamine, there are obtained, 4-{1-[2-(p-fluorobenzoyl)ethyl]-3-pyrrolidinyl}-2H-1,4-benzoxazin-3(4H)-one,
4-{1-[2-(p-methylbenzoyl)ethyl]-3-pyrrolidinyl}-2H-1,4-benzoxazin-3(4H)-one, and
4-{1-[2-(p-methoxybenzoyl)ethyl]-3-pyrrolidinyl}-2H-1,4-benzoxazin-3(4H)-one.

What is claimed:

1. A compound selected from (a) 4-[1-(ω-benzoylalkyl) - 3-pyrrolidinyl]-2H-1,4-benzoxazin-3(4H)-ones of the formula wherein;
R is selected from the group consisting of hydrogen, halogen having an atomic weight less than 80, lower alkyl and lower alkoxy,
n is a positive integer from 2 to 4 inclusive, and
(b) pharmaceutically acceptable salts thereof.

2. A compound of claim 1 wherein n is 3 and R is halogen having an atomic weight less than 80.

3. A compound of claim 2 which is 4-{1-[3-(p-fluorobenzoyl)propyl[ - 3 - pyrrolidinyl}-2H-1,4-benzoxazin-3-(4H)-one.

4. A compound of claim 1 which is 4-{1-[3-(p-methoxybenzoyl)propyl] - 3 - pyrrolidinyl} - 2H-1,4-benzoxazin-3(4H)-one.

5. A compound of claim 1 which is 4-{1-[3-(p-methylbenzoyl)propyl] - 3 - pyrrolidinyl} - 2H-1,4-benzoxazin-3(4H)-one.

6. A compound of claim 1 which is 4-[1-(2-benzoylethyl)-3-pyrrolidinyl]-2H-1,4-benzoxazin-3(4H)-one.

References Cited
UNITED STATES PATENTS

| | | | |
|---|---|---|---|
| 3,069,426 | 12/1962 | Janssen | 260—294.75 |
| 3,097,209 | 7/1963 | Janssen | 260—294.75 |
| 3,125,574 | 3/1964 | Janssen | 260—294.75 |
| 1,915,334 | 6/1933 | Salzberg et al. | 260—243 |
| 2,075,359 | 3/1937 | Salzberg et al. | 424—250 |

HENRY R. JILES, Primary Examiner

S. D. WINTERS, Assistant Examiner

U.S. Cl. X.R.

424—248; 260—340.9